Patented Jan. 10, 1939

2,142,998

UNITED STATES PATENT OFFICE

2,142,998

EXTREME PRESSURE LUBRICANTS AND METHOD OF PREPARING SAME

Martin B. Chittick, Wilmette, Ill., assignor to The Pure Oil Company, Chicago, Ill., a corporation of Ohio No Drawing. Application August 24, 1934, Serial No. 741,237

33 Claims. (Cl. 87—9)

This invention relates to extreme pressure lubricants and to the method of preparing the same. More particularly, my invention relates to the preparation of a material which can be blended in small amounts with mineral lubricating oils to produce lubricants which are capable of withstanding extremely high pressure.

It has heretofore been proposed to treat various oils, such as mineral, vegetable, and animal oils, with sulfur or sulfur compounds such as sulfur chloride, and with chlorine, to increase the ability of such materials to withstand high pressures, or prepare materials which could be blended with mineral lubricating oils to increase their ability of forming films which will not break when subjected to extreme operating conditions.

One of the objects of my invention is to prepare a material which can be blended with hydrocarbon lubricating oil to form liquid or solid lubricants having high E. P. characteristics.

Another object of my invention is to provide a method whereby lubricants having E. P. characteristics can be prepared. Other objects will be apparent from the following detailed description.

In accordance with my invention I treat mineral and fatty oils in general including marine, animal or vegetable oils such as rape seed or castor oil, with phosphorus or a phosphorus compound under temperatures sufficiently elevated to cause the phosphorus or phosphorus compound to react with the oil. As a result of the reaction, a sludge forms which is separated from the bulk of the oil. The portion from which the sludge is separated will then be blended with mineral lubricating oil fractions in such amounts that the phosphorus in the finished oil will vary from a fraction of 1% to approximately 10%, or if the oil which has been treated was of good lubricating quality before treatment, it may be used without subsequent blending.

It has been discovered that phosphorus and phosphorus compounds such as halides and oxyhalides, compounds of the oxygen family including oxides, sulfides, tellurides and selenides, metallic phosphides such as sodium phosphide and tin phosphide, and generally the bi-elemental phosphorus compounds, react with various types of oils to produce products which impart high E. P. characteristics thereto, or to lubricants when blended therewith. The sulfides and chlorides of phosphorus have been found to be particularly effective in producing this result. When lard oil, which has been treated with phosphorus trichloride or phosphorus pentasulfide, was blended with 90% of lubricating oil, the resulting blend produced a film which could not be broken when subjected to the most stringent conditions on a Floyd testing machine. Although sulfides and chlorides of phosphorus have been found to produce unusual results, other phosphorus compounds materially raise the E. P. characteristics of ordinary lubricants, as will be hereinafter disclosed.

The following are specific examples of the preparation of products in accordance with my invention.

Example 1

Unrefined polymers having a high degree of unsaturation, resulting from the treatment of vapor phase cracked gasoline at elevated temperatures with solid adsorbent material such as disclosed in my co-pending application Serial No. 726,352, were treated with 10% of white phosphorus and the mixture heated to 150° F. Some of the white phosphorus ignited at the surface of the oil, oxidizing to phosphorus pentoxide, and the resulting product resembled a black asphaltic mass. To this mass an equal volume of Mid-Continent bright stock having the following characteristics, was added:

| | |
|---|---|
| Gravity, A. P. I. | 21/23 |
| Flash point, ° F | 530/540 |
| Fire, ° F | 600/610 |
| Viscosity, Saybolt, at 210° F | 155/165 |
| Pour point, ° F | 20/25 |

The mixture was heated for 6½ hours at 240/340° F. until the phosphorus had ceased to glow on the surface of the oil. The resulting product contained about 10/20% of black asphaltic material which melted at 275° to 300° F. This material settled to the bottom into a solid insoluble mass. 10% of the resulting liquid material was blended with a Mid-Continent bright stock having the characteristics above mentioned, and the resulting blend was subjected to tests on the Floyd machine to determine its E. P. characteristics of lubricating oil compared to the same oil without addition of treated polymers.

Lubricating oil without phosphorus treated polymers:

Pressure, 15,400 pounds per square inch.
Temperature, 84° F.
Pin sheared in 1 min. 53 sec.

Lubricating oil blended with 10% of phosphorus treated material:

Pressure, 28,875 pounds per square inch.
Temperature, 85° F.
Pin sheared in 7 min. 14 sec.

Pressure, 25,025 pounds per square inch.
Temperature, 98° F.
Pin sheared in 6 min. 53 sec.

Pressure, 15,400 pounds per square inch.
Temperature, 200° F.
Pin sheared in 1 min. 18 sec.

It will be seen from this data that the phosphorus treated lubricant showed considerable improvement over the lubricant without the addition of the phosphorus treated polymers. The shearing of the pin on the Floyd machine indicates the pressure and temperature and time at which the lubricating films broke down.

Example 2

As a second example, a lubricating oil of the characteristics of those above mentioned was heated with 0.7% of white phosphorus for 12½ hours at temperatures from 190° to 300° F. until the phosphorus had ceased to glow and give off phosphorus pentoxide fumes. The only evidence of reaction was a gradual darkening in the color of the oil and a small amount of sludge in the bottom of the vessel. The oil was decanted from the sludge and tested on the Floyd machine. The E. P. characteristics were as follows:

Pressure, 28,875 pounds per square inch.
Temperature, 97° F.
Pin sheared in 7 min. 19 sec.

This material likewise showed considerable improvement over the same oil which had not been treated with phosphorus.

Example 3

A lard oil was heated with 10% white phosphorus at 200° to 300° F. for 9 hours until the phosphorus ceased to glow and no more phosphorus pentoxide fumes were given off. The oil contained about 25% of black sludge. The warm oil was decanted from the sludge and 5% of the phosphorus treated lard oil was blended with a lubricating oil having the above mentioned characteristics. This oil had the following E. P. characteristics:

Pressure, 40,425 pounds per square inch.
Temperature from 91° F. to 230° F.
Pin did not shear during run.

The E. P. characteristics of the lubricant blended with the phosphorus treated lard oil were excellent, being decidedly superior to oil blended with phosphorus treated polymers or the lubricating oil treated with phosphorus.

In the preparation of the material in accordance with Examples 1 to 3, the phosphorus appeared to burn into phosphorus pentoxide. Most of the change in the physical characteristics of the oil took place after a portion of the phosphorus had burned into phosphorus pentoxide, so that it would appear that phosphorus pentoxide is more active in imparting E. P. characteristics to the oil than the phosphorus itself.

Example 4

In order to determine the effect of phosphorus pentoxide in proving E. P. characteristics of lubricants, No. 1 lard oil was heated with 10% phosphorus pentoxide at 300° to 350° F. for 10 minutes. A heavy black sludge was formed and settled to the bottom. The reaction in this respect was very similar to that when white phosphorus was used. 5% of the oil which was decanted from the sludge was blended with 95% of lubricating oil of the aforementioned characteristics. The E. P. characteristics of this blend were good although not equal to those of the sample treated with white phosphorus. The E. P. characteristics were as follows:

Pressure, 40,425 pounds per square inch.
Temperature, 104° F.
Pin sheared in 8 min. 36 sec.

Pressure, 38,500 pounds per square inch.
Temperature, 229° F.
Pin sheared in 8 min. 10 sec.

Example 5

No. 1 lard oil was heated with 10% of phosphorus oxychloride at 170° to 200° F. for 15 minutes. During this time only a slight darkening of the oil occurred. The temperature was slowly increased to 275° F. in order to drive off any remaining phosphorus oxychloride. A black sludge formed in about the same amount as was present when the oil was treated with phosphorus pentoxide. 5% of the oil, after it had been decanted from the sludge, was blended with 95% of lubricating oil of the above mentioned characteristics. The E. P. characteristics were as follows:

Pressure, 32,725 pounds per square inch.
Temperature 109° F.
Pin sheared in 7 min. 32 sec.

Pressure, 15,400 pounds per square inch.
Temperature, 225° F.
Pin sheared in 1 min. 30 sec.

Example 6

In order to determine the effect of white phosphorus in producing a product having high E. P. characteristics when reacted with the oil in a non-oxidizing atmosphere, lard oil was heated to 350° F. with 5% of white phosphorus in an atmosphere of carbon dioxide. There was no evidence of any reaction between the phosphorus and lard oil. Some white phosphorus settled out of the oil on cooling. The experiment was repeated by bubbling the carbon dioxide through the lard oil in order to mix the oil and phosphorus thoroughly. This mixture was heated to 425° F., but again no visible reaction occurred. When the mixture was cooled it was yellow in color, and when exposed to the air, fumed vigorously, indicating that the phosphorus present was oxidizing. The excess phosphorus present in the oil could not be removed without attacking other ingredients that were formed, and because of this fact and the fact that the phosphorus present oxidized vigorously, it was impossible to run E. P. characteristic tests on the Floyd machine.

Example 7

No. 1 lard oil was heated with 10% of phosphorus pentasulfide. Considerable frothing took place at between 200° to 300° F. The heating was continued for about 90 minutes at 290° to 320° F. Some sludge was formed which was allowed to settle, and the oil was decanted. 10% of the treated lard oil was blended with lubricating oil of the aforementioned characteristics, and its E. P. characteristics were determined to be as follows:

Pressure, 42,350 pounds per square inch.
Temperature, 108° to 121° F.
Pin did not shear.

Pressure, 42,350 pounds per square inch.
Temperature, 197° to 203° F.
Pin did not shear.

Pressure, 46,200 pounds per square inch.
Temperature, 227° to 234° F.
Pin did not shear.

This product was determined to have E. P. characteristics superior to any of the products made in accordance with the previous examples.

Example 8

No. 1 lard oil was heated with 5% phosphorus trichloride at 140° to 150° F. for 45 minutes. The oil darkened in color but no sludge was formed at this time. The temperature was raised to 200° F. to drive off any unused phosphorus trichloride. A very slight precipitation of sludge occurred on cooling. 10% of this material was blended with a lubricating oil having the aforementioned characteristics, and the E. P. characteristics of the blend were determined on the Floyd machine. These tests indicated that a lubricant prepared in this manner withstood the same conditions as the lubricant prepared in accordance with Example 7.

It will be apparent from the foregoing examples that I have succeeded in preparing lubricants capable of withstanding extremely high pressures without breaking down under load. Although specific compounds of phosphorus and specific oils have been disclosed for reaction at specific temperatures, it will be understood that my invention is not limited to the materials mentioned nor to the specific conditions disclosed, but that these conditions may vary with the particular oil treated and the particular phosphorus compound employed. The temperature should be sufficiently high to cause the materials to react without causing excessive formation of undesirable materials.

If it is desired to prepare greases, an amount of soap such as sodium, calcium, lead, or aluminum soap, sufficient to impart the desired consistency to the finished material, is included in the blend.

What I claim is:

1. The method of preparing a lubricant which comprises mixing an oil selected from the group consisting of petroleum and fatty oils and a phosphorus containing material capable of reacting with the oil, heating the mixture to a temperature sufficient to promote reaction in order to chemically combine the phosphorus and oil, cooling the reaction products, and separating the liquid from the non-liquid products.

2. The method of preparing a lubricant which comprises mixing an oil selected from the group consisting of petroleum and fatty oils and a bi-elemental phosphorus compound of the oxygen family, heating the mixture to a temperature sufficient to promote reaction in order to chemically combine the phosphorus and oil, cooling the reaction products, and separating the liquid from the non-liquid products.

3. The method of preparing a lubricant which comprises mixing an oil selected from the group consisting of petroleum and fatty oils and a halogen compound of phosphorus, heating the mixture to a temperature sufficient to promote reaction in order to chemically combine the phosphorus and oil, cooling the reaction products, and separating the liquid from the non-liquid products.

4. The method of preparing a lubricant which comprises mixing an oil selected from the group consisting of petroleum and fatty oils and an oxide of phosphorus, heating the mixture to a temperature sufficient to promote reaction in order to chemically combine the phosphorus and oil, cooling the reaction products, and separating the liquid from the non-liquid products.

5. The method of preparing a lubricant which comprises mixing an oil selected from the group consisting of petroleum and fatty oils with a chloride of phosphorus, heating the mixture to a temperature sufficient to promote reaction in order to chemically combine the phosphorus and oil, cooling the reaction products, and separating the liquid from the non-liquid products.

6. The method of preparing a lubricant which comprises mixing an oil selected from the group consisting of petroleum and fatty oils with a sulfide of phosphorus, heating the mixture to a temperature sufficient to promote reaction in order to combine the phosphorus and oil, cooling the reaction products, and separating the liquid from the non-liquid products.

7. Method according to claim 1 in which the oil comprises hydrocarbon polymers having a high degree of unsaturation.

8. Method according to claim 1 in which the oil is lard oil.

9. A composition of matter comprising the reaction product of an oil selected from the group consisting of petroleum and fatty oils, and a phosphorus-containing material, said reaction product being capable of increasing the film strength of mineral lubricating oils when added thereto in relatively small quantities.

10. A composition of matter comprising the reaction product of an oil selected from the group consisting of petroleum and fatty oils, and a halide of phosphorus, said reaction product being capable of increasing the film strength of mineral lubricating oils when added thereto in relatively small quantities.

11. A composition of matter comprising the reaction product of an oil selected from the group consisting of petroleum and fatty oils, and a chloride of phosphorus, said reaction product being capable of increasing the film strength of mineral lubricating oils when added thereto in relatively small quantities.

12. A composition of matter comprising the reaction product of an oil selected from the group consisting of petroleum and fatty oils, and an oxide of phosphorus, said reaction product being capable of increasing the film strength of mineral lubricating oils when added thereto in relatively small quantities.

13. A composition of matter comprising the reaction product of an oil selected from the group consisting of petroleum and fatty oils, and a phosphorus compound of the oxygen family, said reaction product being capable of increasing the film strength of mineral lubricating oils when added thereto in relatively small quantities.

14. A composition of matter comprising the reaction product of an oil selected from the group consisting of petroleum and fatty oils, and a sulfide of phosphorus, said reaction product being capable of increasing the film strength of mineral lubricating oils when added thereto in relatively small quantities.

15. Composition according to claim 11 in which the oil is a highly unsaturated hydrocarbon polymer.

16. A composition of matter comprising a blend of a relatively large proportion of mineral lubricating oil and a relatively small proportion of the reaction product formed when lard oil is heated with phosphorus pentasulfide, said blend forming a film capable of withstanding a load in excess of 45,000 pounds per square inch without breaking.

17. A composition of matter comprising a blend of a relatively large proportion of mineral lubricating oil and a relatively small proportion of the reaction product formed when lard oil is heated with phosphorus trichloride, said blend forming a film capable of withstanding a load in excess of 45,000 pounds per square inch without breaking.

18. A lubricant comprising a major portion of mineral lubricating oil and a minor portion of the product resulting from the chemical reaction of fatty oil with a sulfide of phosphorus.

19. Lubricant in accordance with claim 18 in which the said product results from the chemical reaction of a fatty oil with approximately 10% by weight of a sulfide of phosphorus.

20. A lubricant comprising a major portion of mineral lubricating oil and a minor portion of a product resulting from the chemical action of a fatty oil and a phosphorus yielding substance.

21. A lubricant in accordance with claim 20 in which the fatty oil is lard oil.

22. A lubricant in accordance with claim 20 which contains a fraction of one percent of phosphorus.

23. A lubricant in accordance with claim 20 in which the amount of phosphorus present is between a fraction of one percent and ten percent.

24. A lubricant comprising a blend of mineral lubricating oil and a product resulting from the chemical action of lard oil and a phosphorus yielding compound, the amount of phosphorus present in the blend being a fraction of one percent.

25. A lubricant in accordance with claim 24 in which the phosphorus yielding compound is phosphorus pentoxide.

26. A lubricant in accordance with claim 24 in which the phosphorus yielding compound is a chloride of phosphorus.

27. The method of lubricating mechanism which is subjected to extreme pressure conditions which comprises placing in contact with said mechanism a mineral lubricating oil and a small amount of a product resulting from the chemical reaction of a fatty oil and a phosphorus yielding substance.

28. Method in accordance with claim 27 in which the phosphorus yielding substance is a sulfide of phosphorus.

29. Method in accordance with claim 27 in which the phosphorus yielding substance is phosphorus pentoxide.

30. Method in accordance with claim 27 in which the phosphorus yielding substance is a chloride of phosphorus.

31. An extreme pressure lubricant base comprising the reaction product of a fatty oil and a sulfide of phosphorus.

32. An extreme pressure lubricant base comprising the reaction product of lard oil and a phosphorus-containing material.

33. An extreme pressure lubricant base comprising the reaction product of lard oil and approximately ten per cent of phosphorus pentasulfide.

MARTIN B. CHITTICK.